United States Patent
Anderson et al.

(10) Patent No.: US 6,731,657 B1
(45) Date of Patent: May 4, 2004

(54) MULTIFORMAT TRANSPORT STREAM DEMULTIPLEXOR

(75) Inventors: Richard E. Anderson, Jericho, VT (US); Eric M. Foster, Owego, NY (US); Bryan J. Lloyd, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/525,156

(22) Filed: Mar. 14, 2000

(51) Int. Cl.[7] .................................................. H04J 1/00
(52) U.S. Cl. ........................ 370/536; 370/487; 370/535; 370/543
(58) Field of Search ................................ 370/412, 389, 370/516, 536, 395, 601, 466, 468, 498, 535, 543, 487, 486, 537; 714/746

(56) References Cited

U.S. PATENT DOCUMENTS

| | | | |
|---|---|---|---|
| 5,691,768 A | | 11/1997 | Civanlar et al. |
| 5,886,732 A | | 3/1999 | Humpleman |
| 5,936,968 A | | 8/1999 | Lyons |
| 5,959,659 A | | 9/1999 | Dokic |
| 6,026,506 A | * | 2/2000 | Anderson et al. ............ 714/746 |
| 6,181,706 B1 | * | 1/2001 | Anderson et al. ............ 370/412 |
| 6,229,801 B1 | * | 5/2001 | Anderson et al. ............ 370/389 |
| 6,275,507 B1 | * | 8/2001 | Anderson et al. ............ 370/536 |
| 6,356,567 B2 | * | 3/2002 | Anderson et al. ............ 370/516 |
| 6,359,911 B1 | * | 3/2002 | Movshovich et al. ........ 370/536 |
| 2001/0043621 A1 | * | 11/2001 | Anderson et al. ............ 370/516 |

* cited by examiner

Primary Examiner—Salvatore Cangialosi
(74) Attorney, Agent, or Firm—Schmeiser, Olsen & Watts; William H. Steinberg

(57) ABSTRACT

The preferred embodiment of the present invention provides an improved receiver that can receive and process many different data types in addition to decoding MPEG-2 transport streams. The preferred embodiment minimizes hardware complexity by using the same loaders for both MPEG-2 and alternative stream data. The preferred embodiment utilizes a bypassable synchronizer and a bypassable packet parser to allow alternative data streams to be sent to system memory for decoding by a the host processor. When receiving MPEG-2 transport streams, the bypassable synchronizer and bypassable packet parser are used to synchronize and filter the MPEG-2 transport stream. The parsed MPEG-2 streams are then loaded into a packet buffer and passed to the video and audio decoders. When non-MPEG-2 stream data is provided, the bypassable synchronizer and bypassable packet parser instead forward the data to the packet buffer without performing synchronization or filtering. There, the non-MPEG-2 stream data is loaded into system memory. In memory, the non-MPEG-2 data can be decoded by the CPU and then passed onto the video and audio decoders. Thus, by selectively bypassing synchronizer and packet parser, the preferred embodiment allows the receiver to decode non-MPEG-2 data streams while maintaining the ability to perform real time decoding of MPEG-2 streams. Additionally, the preferred embodiment facilitates this dual purpose while minimizing device complexity.

20 Claims, 4 Drawing Sheets

MULTIFORMAT TRANSPORT STREAM DEMULTIPLEXOR

BACKGROUND OF THE INVENTION

1. Technical Field

The present invention relates in general to the digital delivery systems. More specifically, the present invention relates to the delivery of multiformat digital video and digital audio data.

2. Background Art

Digital television offers viewers high-quality audio and video. For broadcasters, the compression of data provided by digital systems allow several programs to be delivered over the same analog bandwidth. Digital television can be distributed using adapted versions of current analog systems, including satellite, terrestrial, and cable. In all these systems, the audio and video components of a program are compressed at the source and multiplexed with other programs and system information needed to recreate the original program. The multiplexed signal is modulated and transmitted to the subscriber's home. A receiver at the subscriber's home demodulates the signal to recover the multiplexed digital streams, extracts the program of interest, and decodes the compressed audio and video for presentation on the television.

There are several variations of this system. For example, the digital stream can be modulated and broadcast over a coaxial cable system currently installed or delivered over satellite systems. In addition, the receiver may be a stand alone "set-top box" or may be integrated into directly into the television or other entertainment devices.

There are a variety of possible methods of encoding and delivering the digital television programs. To promote the development of interoperable components from different manufacturers, the Moving Picture Experts Group ("MPEG") has created several different international standards. Of these, the MPEG-2 standard is particularly applicable to the delivery of digital television programs. This standard specifies the format of data as it is broadcast. The standard is composed of three primary parts covering systems, video and audio. The video and audio parts specify the format of the compressed video and audio data, while the systems part specifies the formats for multiplexing the audio and video data for one or more programs as well as information necessary for recovery of the programs. The MPEG-2 standard specifies two stream formats, one for error-free environments such as a digital storage mediums, and one for error-prone environments such as satellite, cable, ATM and other networks. The latter format, often referred to as the "transport stream" is used for broadcast applications. Turning to FIG. 4, a simplified block diagram of a MPEG-2 receiver is illustrated. A tuner extracts the analog signal, which is then digitized. The demodulator recovers the symbols, which represent the incoming bit stream. This group of functions is often referred to as the network interface-module (NIM). The final output of the NIM is the MPEG-2 transport stream, which is then fed into the transport demultiplexor.

The transport demultiplexor extracts the audio and video portions of the program to be sent to the audio and video decoders. The data which specifies the stream content is delivered to memory to enable the processor to configure the receiver to deliver a particular program.

One potential downside to these systems is the inability of these systems to deal with other types of data. For example, previous MPEG-2 receivers have been limited by their inability to deal with other types of video and audio data. Specifically, the real time constraints on MPEG systems requires dedicated hardware that cannot be easily adapted to receive other types of data formats.

Specifically, in current receivers, real-time constraints on synchronization and clock recovery require that the initial stages of the transport demultiplexor be implemented in hardware. These transport demultiplexors require that the data be in the correct MPEG-2 transport syntax. Otherwise, the data cannot be processed correctly.

Thus, what is needed is an improved receiver with that can receive and process other data information in addition to maintaining real-time processing support for MPEG-2 transport streams.

DISCLOSURE OF THE INVENTION

The preferred embodiment of the present invention provides an improved receiver that can receive and process many different data types in addition to decoding MPEG-2 transport streams. For example, the preferred embodiment can be used to process data Asynchronous Transfer Mode (ATM), Digital Versatile Disc (DVD), and other transport streaming formats. The preferred embodiment minimizes hardware complexity by using the same loaders for both MPEG-2 and alternative stream data. The preferred embodiment utilizes a bypassable synchronizer and a bypassable packet parser to allow alternative data streams to be sent to system memory for decoding by a the host processor. When receiving MPEG-2 transport streams, the bypassable synchronizer and bypassable packet parser are used to synchronize and filter the MPEG-2 transport stream. The parsed MPEG-2 streams are then loaded into a packet buffer and passed to the video and audio decoders. When non-MPEG-2 stream data is provided, the bypassable synchronizer and bypassable packet parser instead forward the data to the packet buffer without performing synchronization or filtering. There, the non-MPEG-2 stream data is loaded into system memory. In memory, the non-MPEG-2 data can be decoded by the CPU and then passed onto the video and audio decoders. Thus, by selectively bypassing synchronizer and packet parser, the preferred embodiment allows the receiver to decode non-MPEG-2 data streams while maintaining the ability to perform real time decoding of MPEG-2 streams. Additionally, the preferred embodiment facilitates this dual purpose while minimizing device complexity.

The foregoing and other features and advantages of the present invention will be apparent from the following more particular description of the preferred embodiment of the invention, as illustrated in the accompanying drawings.

BEST MODE FOR CARRYING OUT THE INVENTION

Figure 1:
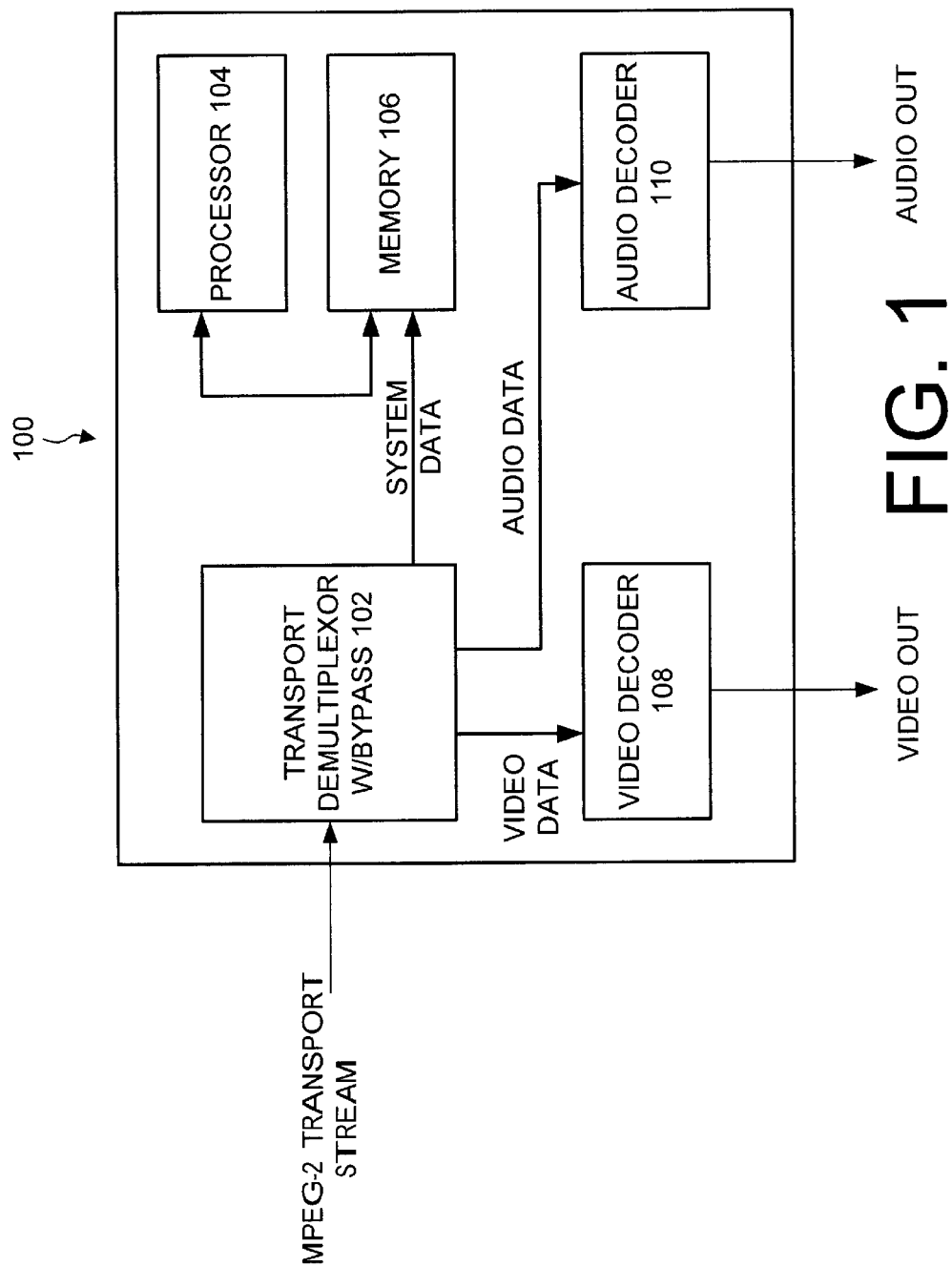
FIG. 1 is a first block diagram of a transport stream receiver system in accordance with a preferred embodiment of the present invention.

As discussed above, the preferred embodiment of the present invention was developed for use with the MPEG-2 digital video and audio broadcasting. Individuals skilled in the art of MPEG-2 encoding and decoding may wish to proceed with to the Detailed Description section of this specification. However, those individuals who are new to MPEG-2 technology, or new to digital video transmission, should read this overview section in order to best understand the benefits and advantages of the present invention.

1. Overview

MPEG-2

One commonly used video and audio compression standard is the Moving Picture Experts Group ("MPEG") standard. Within the MPEG-2 standard, video compression is defined both within a given picture i.e., spatial compression, and between pictures, i.e., temporal compression. Video compression within a picture is accomplished by conversion or the digital image from the time domain to the frequency domain by a discrete cosine transform, quantization, variable length coding, and Huffman coding. Video compression between pictures is accomplished via a process referred to as motion compensation, in which a motion vector is used to describe the translation of a set of picture elements (pels) from one picture to another. Audio compression is as also defined in the MPEG-2 Standard.

The procedure for transporting the compressed bitstream from the transmitting end to the receiving end of the system, and for thereafter decompressing the bitstream at the receiving end, so that one of the many picture sequences is decompressed and may be displayed in real-time is specified in ISO 13818-1. ISO 13818-1 is the systems or transport layer portion of the MPEG-2 standard. This portion of the standard specifies packetization of audio and video elementary bitstreams into packetized elementary streams (PES), and the combinations of one or more audio and video packetized elementary streams into a single time division or packet multiplexed bitstream for transmission and the subsequent demultiplexing of the single bitstream into multiple bitstreams for decompression and display.

In MPEG transmission, the elementary video, audio and system data streams are packetized into packetized elementary streams, as described below. The packetized elementary streams of audio data, and video data, and the packets of other data and systems data are packet multiplexed by the multiplexor into a system stream. The transmission bitstream is thus comprised of packets. Each packet is in turn, made up of a packet header, an optional adaptation field, and packet data bytes, i.e., payload.

The MPEG-2 System Layer has the basic task of facilitating the multiplexing of one or more programs made up of related audio and video bitstreams into a single bitstream for transmission through a transmission medium, and thereafter to facilitate the demultiplexing of the single bitstream into separate audio and video program bitstreams for decompression while maintaining synchronization. By a "Program" is meant a set of audio and video bitstreams having a common time base and intended to be presented simultaneously. To accomplish this, the system layer defines the data stream syntax that provides for timing control and the synchronization and, interleaving of the video and audio bitstreams. The system layer provides capability for (1) video and audio synchronization, (2) stream multiplex, (3) packet and stream identification, (4) error detection, (5) buffer management, (6) random access and program insertion, (7) private data, (8) conditional access, and (9) interoperability with other networks, such as those using asynchronous transfer mode (ATM).

Under the MPEG-2 Standard a time division or packet multiplexed bitstream consists of two layers, (1) a compression layer, also referred to as an inner layer, a payload layer, or a data layer, and (2) a system layer, also referred to as an outer layer or a control layer. The compression layer or inner layer contains the data fed to the video and audio decoders, and defines the coded video and audio data streams, while the system layer or outer layer provides the controls for demultiplexing the interleaved compression layers, and in doing so defines the functions necessary for combining the compressed data streams.

A MPEG-2 bitstream including a system layer and compression layer, is the input to a system decoder. In the system decoder the system layer data is demultiplexed into the compressed audio layer, the compressed video layer, and control data. The compressed data is sent to the respective audio and video data buffers, and through decoder control to the respective audio and video decoders.

The system layer supports a plurality of basic functions, (1) time division or packet multiplexing and demultiplexing of the time division or packet multiplexed multiple bitstreams, (2) synchronous display of the multiple coded bit streams, (3) buffer management and control, and (4) time recovery and identification. The system layer also supports (5) random access, (6) program insertion, (7) conditional access, and (8) error tracking.

For MPEG-2, the standard specifies two types of layer coding, a program stream (PS), for relatively lossless environments, such as CD-ROMs, DVDs, and other storage media, and transport stream (TS), for lossy media, as cable television, satellite television, and the like. The transport stream (TS), consists of a stream of transport stream packets, each of which consists of 188 bytes, divided into 4 bytes of packet header, an optional adaptation field, and up to 184 bytes or the associated packet data, that is, payload.

The transport stream (TS) is used to combine programs made up of PES-coded or raw elementary data with one or more independent time bases into a single stream. Note that under the MPEG-2 standard, an individual program does not have to have a unique time base, but that if it does, the time base is the same for all of the elements of the individual program.

The packetized elementary stream (PES) layer is an inner layer portion of the MPEG-2 time division or packet multiplexed stream upon which the transport or program streams are logically constructed. It provides stream specific operations, and supports the following functions: (1) a common base of conversion between program and transport streams, (2) time stamps for video and audio synchronization and associated timing, especially for associated audio and video packets making up a television channel, presentation, or program, and having a common time base, (3) stream identification for stream multiplexing and demultiplexing, and (4) such services as scrambling, VCR functions, and private data.

Video and audio elementary streams (ES) are most often PES-packetized before inserting into a transport stream (TS). Elementary streams (ES) are continuous. PES packets containing an elementary stream (ES) are generally of fixed lengths. Typically, video PES packets are on the order of tens of thousands of bytes, and audio PES packets are on the order of thousands of bytes. However, video PES packets can also be specified as of undefined length.

The MPEG-2 packetized elementary stream (PES) packet structure includes a PES header, an optional header, and payload. The PES header has bit start code, a packet length field, a 2 bit "10" field, a scramble control field, a priority field, a data alignment field, a copy field, a PTS/DTS (Presentation Time Stamp/Decoding Time Stamp) field, a field for other flags, and a header length field.

The "Optional Header" field includes a Presentation Time Stamp field, a Decoding Time Stamp field, an elementary stream clock reference field, a elementary stream rate field, a trick mode field, a copy info field, a Prior Packetized Elementary Stream Clock Recovery field, an extension, and stuffing.

The packet start code provides packet synchronization. The stream ID field provides packet identification. Payload identification is also provided by the stream ID. The PTS/DTS flag fields and the PTS/DTS fields provide presentation synchronization. Data transfer is provided through the packet/header length, payload, and stuffing fields. The scramble control field facilitates payload descrambling, the extension/private flag fields and the private data fields provide private information transfer.

A transport stream (TS) may contain one or more independent, individual programs, such as individual television channels or television programs, where each individual program can have its own time base, and each stream making up an individual program has its own PID. Each separate individual program has one or more elementary streams (ES) generally having a common time base. To be noted, is that different transport streams can be combined into a single system transport stream. Elementary stream (ES) data, that is, access units (AU), are first encapsulated into packetized elementary stream (PES) packets, which are in turn, inserted into transport stream (TS) packets.

At the transport layer, the transport sync byte provides packet synchronization. The Packet Identification (PID) field data provides packet identification, demultiplexing, and sequence integrity data. The PID field is used to collect the packets of a stream and reconstruct the stream. The continuity counters and error indicators provide packet sequence integrity and error detection. The Payload Unit start indicator and Adaptation Control are used for payload synchronization, while the Discontinuity Indicator and Program Clock Reference (PCR) fields are used for playback synchronization. The transport scramble control field facilitates payload descrambling. Private data transfer is accomplished through the Private Data Flag and Private Data Bytes. The Data Bytes are used for private payload data transfer, and the Stuffing Bytes are used to round out a packet.

A transport stream is a collection of transport stream packets, linked by standard tables. These tables carry Program Specific Information (PSI) and are built when a transport stream is created at the multiplexor. These tables completely define the content of the stream. Two of the tables of the transport stream are the Program Association Table (PAT) and the Program Map Table (PMT).

The Program Association Table is a table of contents of the transport stream. It contains an ID that uniquely identifies the stream, a version number to allow dynamic changes of the table and the transport stream, and an association table of pairs of values. The pairs of values, PN, and PMT-PID, are the Program Number (PN) and the PID of the tables containing the program (PMT-PID).

The Program Map Table is a complete description of all of the streams contained in a program. Each entry in the Program Map Table is related to one and only one program. The role of the Program Map Table is to provide a mapping between packets and programs. The program map table contains a program number that identifies the program within the stream, a descriptor that can be used to carry private information about the program, the PID of the packets that contain the synchronization information, a number of pairs of values (ST, Data-PID) which, for each stream, specify the stream type (ST) and the PID of the packets containing the data of that stream or program (Data-PID).

There is also a Network Information Table used to provide a mapping between the transport streams and the network, and a conditional Access Table that is used to specify scrambling/descrambling control and access.

In use, the tables are used to select and reconstruct a particular program. At any point in time, each program has a unique PID in the Program Map Table. The Program Map Table provides the PIDS for the selected program audio, video, and control streams. The streams with the selected PIDS are extracted and delivered to the appropriate buffers and decoders for reconstruction and decoding.

Achieving and maintaining clock recovery and synchronization is a problem, especially with audio and video bitstreams. The MPEG-2 model assumes an end-to-end constant delay timing model in which all digital image and audio data take exactly the same amount of time to pass through the system from encoder to decoder. The system layer contains timing information that requires constant delay. The clock references are Program clock reference (PCR) and the time stamps are the Presentation Time Stamp/Decoding Time Stamp(PTS/DTS).

The decoder employs a local-system clock having approximately the same 27 Megahertz frequency as the encoder. However, the decoder clock can not be allowed to free run. This is because it is highly unlikely that frequency of the decoder clock would be exactly the same as the frequency of the encoder clock.

Synchronization of the two clocks is accomplished by the Program Clock Reference (PCR) data field in the Transport Stream adaptation field. The Program Clock Reference values can be used to correct the decoder clock. Program Clock Reference, or PCR, is a 42 bit field. It is coded in two parts, a PCR Base having a 33 bit value in units of 90 kHz, and an extension having a 9-bit extension in units of 27 MHZ, where 27 MHZ is the system clock frequency.

As a general rule, the first 33 bits of the first PCR received by the decoder initialize the counter in a clock generation, and subsequent PCR values are compared to clock values for fine adjustment. The difference between the PCR and the local clock can be used to drive a voltage controlled oscillator, or a similar device or function, for example, to speed up or slow down the local clock.

Audio and video synchronization is typically accomplished through the Presentation Time Stamp (PTS) inserted in the Packet Elementary Stream (PES) header. The Presentation Time Stamp is a 33-bit value in units of 90 kHz, where 90 kHz is the 27 MHZ system clock divided by 300. The PTS value indicates the time that the presentation unit should be presented to the user.

In digital video systems, such as MPEG-2 Systems, DSS Systems, DVB Systems, HDTV Systems, and the like, there is a need to demultiplex the incoming data stream Typically, transport demultiplexors receive the incoming data stream from a network module, and break it into individual components that are passed to, e.g., an audio decoder, a video decoder, and a system memory. These functions are related. Under host processor control there is provided a Network Interface and Transport Demultiplexor. The Transport Demultiplexor demultiplexes the input into a System Memory Input, an Audio Decoder Input, and a Video Decoder Input.

2. Detailed Description

The preferred embodiment of the present invention provides an improved receiver that can receive and process many different data types in addition to decoding MPEG-2 transport streams. For example, the preferred embodiment can be used to process data Asynchronous Transfer Mode (ATM), Digital Versatile Disc (DVD), and other transport streaming formats. The preferred embodiment minimizes hardware complexity by using the same loaders for both MPEG-2 and alternative stream data. The preferred embodiment utilizes a bypassable synchronizer and a bypassable packet parser to allow alternative data streams to be sent to system memory for decoding by the host processor. When receiving MPEG-2 transport streams, the bypassable synchronizer and bypassable packet parser are used to synchronize and filter the MPEG-2 transport stream. The parsed MPEG-2 streams are then loaded into a packet buffer and passed to the video and audio decoders. When non-MPEG-2 stream data is provided, the bypassable synchronizer and bypassable packet parser instead forward the data to the packet buffer without performing synchronization or filtering. There, the non-MPEG-2 stream data is loaded into system memory. In memory, the non-MPEG-2 data can be decoded by the CPU and then passed onto the video and audio decoders. Thus, by selectively bypassing synchronizer and packet parser, the preferred embodiment allows the receiver to decode non-MPEG-2 data streams while maintaining the ability to perform real time decoding of MPEG-2 streams. Additionally, the preferred embodiment facilitates this dual purpose while minimizing device complexity.

Turning now to FIG. 1, a simplified illustration of digital receiver 100 in accordance with the preferred embodiment of the present invention is illustrated. In particular, FIG. 1 illustrates the operation of the preferred digital receiver 100 when receiving a MPEG-2 transport stream. The digital receiver 100 includes a transport demultiplexor with bypass 102, a processor 104, a memory 106, a video decoder 108 and an audio decoder 110. When receiving a MPEG-2 transport stream, the transport demultiplexor 102 operates to synchronize and filter the MPEG-2 transport stream. The filtered audio and video data packets are then passed on to the video decoder and audio decoder, where they are then output to the appropriate entertainment device.

Specifically, the transport demultiplexor 102 synchronizes by locating the appropriate sync byte used to establish the packet boundaries in the MPEG-2 transport stream. When the transport Demultiplexor 102 successfully locates the sync byte for several consecutive packets, the transport demultiplexor 102 parses the packets and locates the packet identifier (PID). The PID in each filter allows the transport demultiplexor 102 to identify all packets belonging to the same data stream, and thus facilitate the reconstruction of the selected program. These reconstructed video and audio streams then sent to the video decoder 108 and audio decoder 110, where they are outputted to the entertainment device.

In MPEG-2 operation, the processor 104 and memory 106 receive only system data and use this system data to control operation of the receiver. Thus, the reconstruction of the desired program streams is handled almost entirely by the transport demultiplexor 102. This allows the MPEG-2 stream to be properly decoded using the real time processing abilities of the transport demultiplexor 102.

Figure 2:
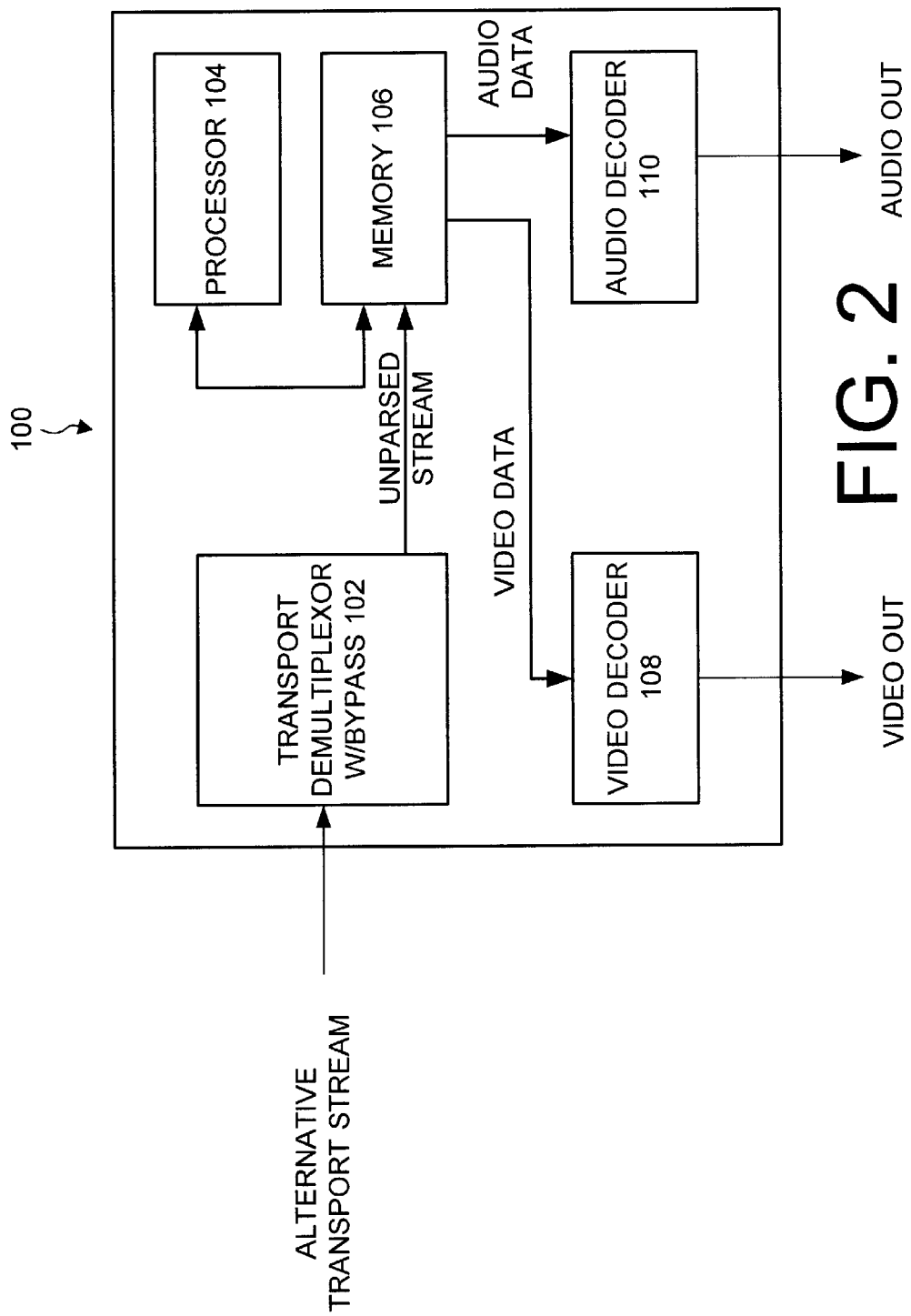
FIG. 2 is a second block diagram of a transport stream receiver system in accordance with the preferred embodiment.

As described above, the digital receiver 100 includes the ability to handle alternative data streams in addition to the MPEG-2 transport stream. Turning now to FIG. 2, a second simplified illustration of digital receiver 100 in accordance with the preferred embodiment of the present invention is illustrated. In particular, FIG. 2 illustrates the operation of the preferred digital receiver 100 when receiving a alternative, non-MPEG-2 transport streams. In this case, the transport stream is not synchronized, filtered, or reconstructed by the transport demultiplexor 102. Instead, the transport demultiplexor 102 collects the unfiltered stream and loads it to memory 106. With the unfiltered stream delivered to memory 106, the processor 104 can operate on the stream data to reconstruct the stream in appropriate video and audio streams. For example, if the alternative transport stream comprises ATM data, the processor 104 will recognize the data type, and reconstruct the ATM data into the appropriate video and audio streams which can then be decoded by video decoder 108 and audio decoder 110. In this way, the digital receiver 100 can operate to decode non-MPEG-2 transport streams and provide the decoded streams to the entertainment device.

Figure 3:
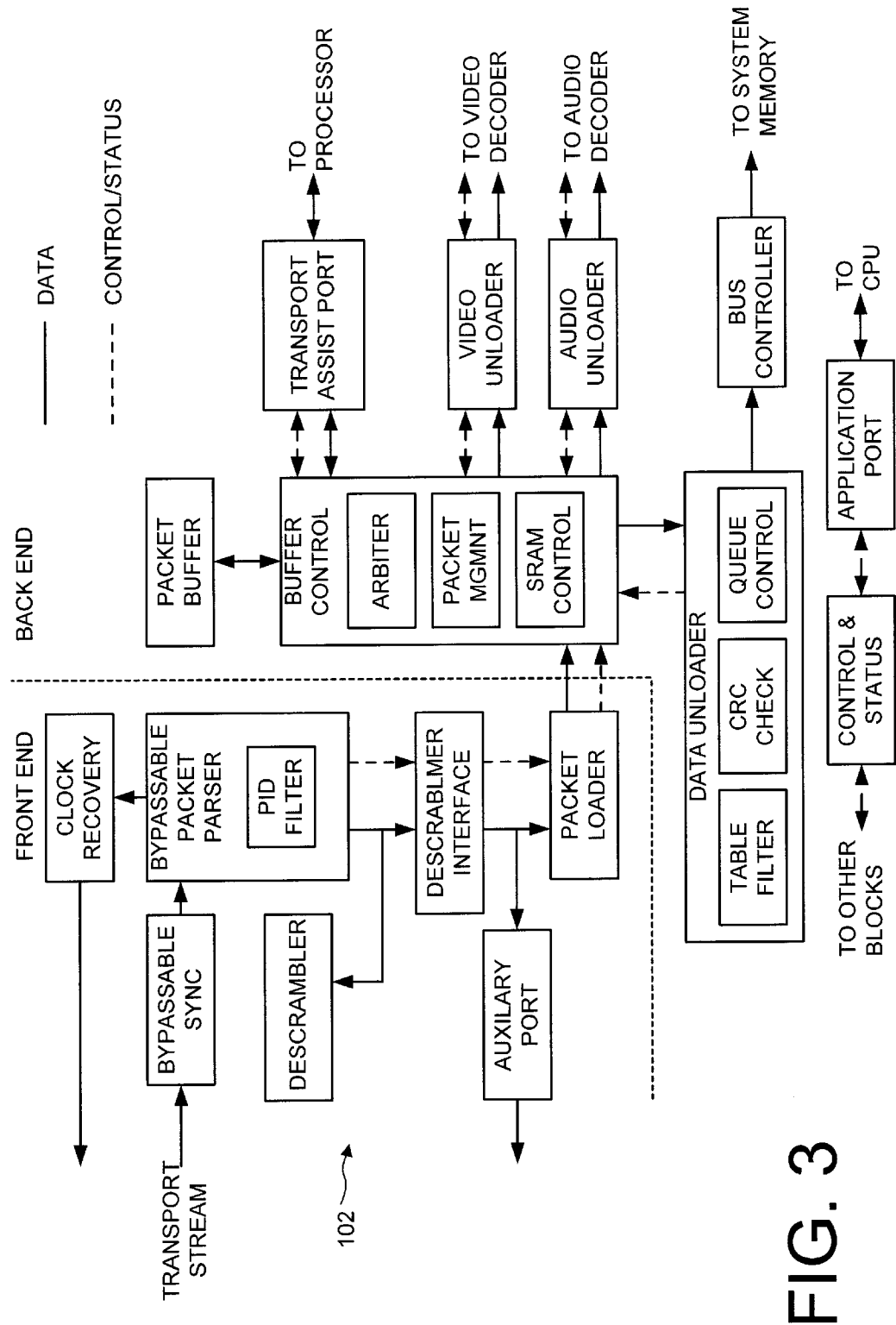
FIG. 3 is a block diagram of a transport demultiplexor in accordance with the preferred embodiment.
Figure 4:
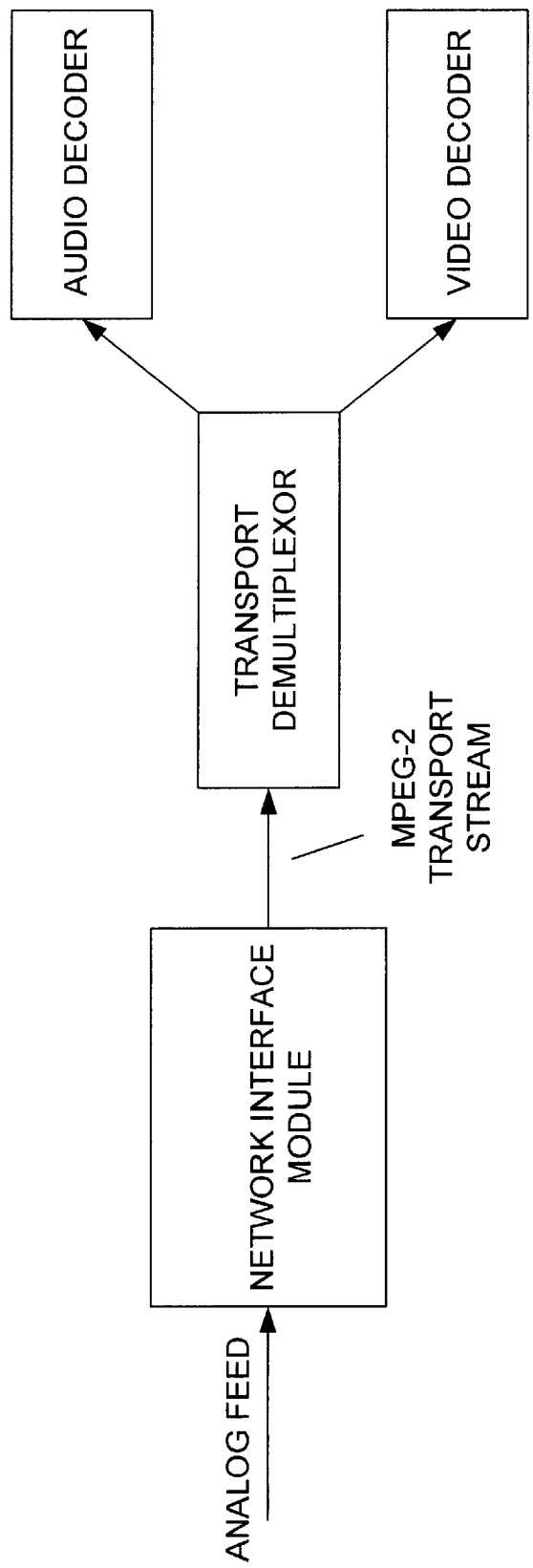
FIG. 4 is a block diagram of a prior art digital transmission and receiver system.

Turning now to FIG. 3, the preferred embodiment transport demultiplexor 102 is illustrated in more detail. Again, in accordance with the preferred embodiment, transport demultiplexor 102 can operate to decode and reconstruct MPEG-2 transport streams, and can also serve to load non-MPEG-2 transport streams to memory for decoding and reconstruction by the processor. The transport demultiplexor 102 is divided into three major sections: a front end, an packet buffer, and a back end. The front end includes synchronization, PID filter parsing and descrambling functions. Thus, the front end processes fields related to the header and adaptation fields in MPEG-2 streams. The packet buffer stores arriving packets for processing by the back end, as well as control and status information. The back end, which processes packet payloads, includes three separate unloaders: one for audio, one for video, and one for system data. As will be explained in greater detail below, the data unloader is used in the preferred embodiment for both system data in MPEG-2 processing and for all program data in non-MPEG-2 processing. Both the front end and the back end access the packet buffer through a common cycle-by-cycle arbiter. The front end passes information about each packet to the back end through an information word that is appended to the beginning of each packet.

The transport demultiplexor front end includes a bypassable synchronizer and a bypassable packet parser. As stated before, MPEG-2 transport packets are 188-byte packets with hx47 sync bytes at the start of each packet. Thus, the bypassable synchronizer synchronizes MPEG-2 data streams by locating hx47 bytes spaced 188 bytes apart. When the hx47 sync bytes have been successfully located for several packets, bypassable synchronizer passes the synchronized stream to the bypassable packet parser. The bypassable packet parsers operates to filter MPEG-2 transport streams by parsing the packets and located the packet identifier (PID). Again, the PID allows the parser to identify all of the packets belonging to the same data stream, making it possible filter out unselected data and to reconstruct the selected program stream within the receiver. In particular, packets with the same PID are considered a PID stream. As an example, a program typically requires at least one audio and one video stream. Within the transport stream, the packets containing the audio stream for a program will have the same PID, and the packets containing the video stream will have the same PID.

Thus, the bypassable packet parser extracts the PID from the packet header of each packet in the MPEG-2 stream. The packet parser then compares the extracted PID to active PIDs in the PID filter. The packet parser thus uses the PID to filter the transport stream for packets belonging to a selected program. Packets belonging to the same program (i.e., video and audio packets having the same PID) as well as packets containing MPEG-2 system data are then passed to the packet loader, where they are loaded into the packet buffer by the buffer control. Concurrently, the packet parser sends PCRs from matching PCR packets to the clock recovery unit to reconstruct the STC. The optional descrambler can be configured to descramble the payloads of selected packets.

As stated above, in accordance with the preferred embodiments, the synchronizer and packet parser are both bypassable. Specifically, by selectively setting a register bit the processor can determine whether the synchronizer operates to synchronize incoming data streams, as it would when receiving MPEG-2 transport streams, or whether synchronizer passes the data stream to the packet parser without synchronization. Likewise, by selecting another register bit, the processor can determine whether the packet parser extracts PIDs from incoming data packets, compares the extracted PIDs to active PIDs in the PID filter, and passes on the selected packets to the packet buffer, or whether the packet parser instead passes all received packets to the packet buffer without parsing or filtering. It should be noted that during this alternative transport stream processing, the packet parser does not attempt to break up the stream data according to any predefined packets, instead, it simply divides all the data into 188 byte packets according to the order received.

In the preferred embodiment, the bypassable packet parser also adds status and type indicators which are sent along with the parsed packets to be stored in the packet buffer. In particular, in the preferred embodiment an information word comprises four bytes of data is appended to each packet of data passing through the bypassable packet parser. This information word is preferably added to both MPEG-2 and alternative data streams. The information word is used to pass handling instruction for the appended packet to the back end transport demultiplexor. In the preferred embodiment, the information word added to the packet includes a PID index value for the appended packet. This PID index value is then used by the back end of the transport demultiplexor to direct the routing of the packet. In particular, the PID index value is used to identify the packet as belonging either a MPEG-2 video stream, a MPEG-2 audio stream, one of several types of MPEG-2 system data, or an alternative transport stream. The PID index value is then used by the buffer control and data unloader to control the final destination of the appended packet. Thus, MPEG-2 video streams are sent to the video unloader, MPEG-2 audio streams are sent to the audio unloader, MPEG-2 system data is sent to a specified queue in the system memory, and alternative transport streams are sent to, system memory.

For MPEG-2 processing, the PID index value for video, audio and system data is preferably generated from the PID values stored in the MPEG-2 packet headers. Thus, the PID index value can be used to identify the corresponding program in the case of audio and video packets, or the type of system data in the case of system data packets. For alternative stream processing, the packet parser is bypassed and thus the PID value is simply assigned to a predetermined value to denote its alternative stream status.

The back end of the transport demultiplexor 102 includes a packet buffer, a buffer control, a video unloader, a audio unloader and a data unloader. The packet buffer serves as a temporary store for MPEG-2 and alternative stream data before the data is passed onto the unloaders. In the preferred embodiment, the packet buffer includes sufficient storage to store at least ten 188 byte transport packets and their appended four byte information words. This allows the packet buffer to efficiently absorbs any latency of unloaders.

The buffer control operates to control access to the packet buffer. Specifically, the buffer control operates to determine when the packet loader can load data to the packet buffer, and when the video unloader, audio unloader, and data unloaders can unload data from the packet buffer. The buffer control preferably includes an arbiter, packet management and SRAM control. The arbiter determines on a cycle by cycle basis which loader/unloader is the next to have access to the packet buffer. Packet management keeps track of the location and type of packets stored in the packet buffer. Packet management determines the type of packet from the appended information word on each packet. Thus, when a unloader requests the next packet, packet management can retrieve the correct next packet and deliver it to the requesting unloader. The SRAM control provides low level hardware control over the packet buffer.

As mentioned above, the preferred embodiment includes three unloaders, a video unloader, a audio unloader, and a data unloader. The video unloader is used to unload MPEG-2 video data from the packet buffer and deliver that video data to the video decoder. Likewise, the audio unloader is used to unload MPEG-2 audio data from the packet buffer and deliver that audio data to the audio decoder. The data unloader servers two functions. First, it is used to unload MPEG-2 system data from the packet buffer and pass the MPEG-2 system data to one of a plurality of circular buffers in the system memory. Second, the data unloader is used to unload alternative stream data from the packet buffer to the system memory, where it can then be reconstructed and decoded under the direction of the processor. All three decoders operate by requesting data from the buffer control. The buffer control then retrieves the appropriate data, and delivers the data to the requesting unloader on a word by word basis. The unloaders act to reconstruct the packets into an appropriate stream, and pass those packets to their destination.

The data unloader preferably includes additional functionality. In particular, the data unloader preferably includes a table filter, a CRC check, and queue control. The queue control is used to determine the placement of various types of system data. In particular, in the preferred embodiment, the PID index value appended to MPEG-2 system data packets is used by the queue control to direct the system packets to one of a plurality of rolling buffers which reside in the system memory. This allows system data of the same type to be placed together in memory. For example, system data relating to program information can be placed together by giving those system data packets the same PID index value in the packet parser. Additionally, using the PID index value checking, the queue control can put all alternative transport stream data into a desired location in system memory, where it can properly operated upon by the processor, and delivered to the video decoder and audio decoder in proper format.

The table filter and CRC check provide the ability to further filter and error check MPEG-2 system data. In particular, the table filter provides filtering before memory storage of MPEG-2 system tables. Table filtering before memory storage by the transport demultiplexor reduces the load on the application processor by filtering table sections before sending them to DRAM or other memory. The CRC check checks the CRC value of table sections against the value coded in the stream. Those sections that do not pass the CRC check are discarded, and the application optionally notified.

Other illustrated elements of the transport demultiplexor serve to modify and control its operation. For example, the transport assist port is used by the processor to modify the operation of the transport demultiplexor. This provides the ability of the host processor to modify operation to provide flexibility as needed. The transport assist port gives the processor direct access to the internal packet buffer, including the information word that this passed by the front end units to the back end unloaders, and indicates how to process the corresponding packet. The transport can be configured through special registers to hold a given packet type in the buffer under certain conditions. The processor can then parse the packet data, determine the proper action, modify the packet data or information word accordingly, and release the packet to the back-end unloaders, which processes it as indicated.

Thus, the preferred embodiment of the present invention provides a flexible receiver, that includes the ability to efficiently process multiple transport stream formats while minimizing device complexity. Particularly, during MPEG-2 transport stream processing, transport stream data is synchronized, filtered by packet ID, loaded into the packet buffer, and loaded to video, audio and data unloaders. From there, the video and audio data is sent to the video and audio decoder respectively, while the system data is sent to the system memory. In contrast during alternative transport stream processing, the synchronizer and/or packet parser filtering are bypassed. The alternative transport stream data is thus sent directly to the packet buffer without parsing on predefined packet boundaries. The data unloader then loads the alternative transport stream data into system memory through the bus controller. There, the processor operates to decode and reconstruct the alternative transport stream into a format that can then be delivered to the video and audio decoders. Thus, the preferred embodiment provides the ability to handle multiple data formats, while maintaining the ability to perform real time processing and without excessive device complexity.

It should be especially noted that in the preferred embodiment of the present invention, significant portions of the transport Demultiplexor are used for both MPEG-2 and alternative stream types. For example, the memory unloader and bus controller are used to load system data to system memory during MPEG-2 processing, and are also used to load all packet data, including audio and video, to system memory during non-MPEG-2 processing. This reuse of hardware significantly reduces the complexity of the transport demultiplexor while maintaining the desired flexibility.

While the embodiments and exemplifications of our invention have been described and illustrated with respect to one particular standard, the MPEG-2 standard, it be used with other data formats. For example, the methods and apparatus of our invention can be used with other time division multiplexed and packet multiplexed data streams, having packetized headers and data, including, by way of example, the European Telecommunications standards Institute (ETSI) Digital Video Broadcasting (DYB) standard, the High Definition Television (HDTV) standard, and the Direct satellite System (DSS) standard, among others.

While the invention has been described with respect to certain preferred embodiments and exemplifications, it is not intended to limited to scope the invention thereby, but solely by the claims appended hereto.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. A transport demultiplexor, the transport demultiplexor selectively receiving a first type transport stream and second type transport stream, the transport demultiplexor delivering first type transport stream system data to a data unloader, first type transport stream video data to a video unloader, and first type transport audio data to an audio unloader, the transport demultiplexor delivering second type transport stream data to the data unloader, the data unloader delivering the second type transport stream data to the data unloader, the data unloader delivering the second type transport stream data to system memory for processing, the transport demultiplexor including a bypassable synchronizer, the bypassable synchronizer receiving the first and second type of transport stream and synchronizing the first type transport stream before passing said first type transport stream, the bypassable synchronizer passing said second type of transport stream without regard to synchronization.

2. The transport demultiplexor of claim 1 wherein the transport demultiplexor includes a bypassable packet parser and a packet buffer, the bypassable packet parser receiving the first and second type transport stream from the bypassable synchronizer, the bypassable packet parser filtering the first type transport stream data before passing to the packet buffer, the bypassable packet parser delivering second type transport stream data to the packet buffer without filtering.

3. The transport demultiplexor of claim 2 wherein the bypassable packet parser includes a filter, the filter comparing packet identifications for first type transport stream data to a selected packet identification.

4. The transport demultiplexor of claim 1 further comprising a packet buffer, the packet buffer buffering the first type transport stream and the second type transport stream.

5. The transport demultiplexor of claim 4 further comprising buffer control, wherein the buffer control includes a packet manager, the packet manager selectively receiving first type transport stream video data from the packet buffer when requested by the video unloader, the packet manager selectively retrieving first type transport audio data from the packet buffer when requested by the audio unloader, the packet manager selectively receiving said first type transport stream system data and second type transport stream data from the packet buffer when requested by the data unloader.

6. The transport demultiplexor of claim 1 wherein the first type of transport stream comprises an MPEG-2 transport stream, and wherein the second type of transport stream comprises a non-MPEG-2 transport stream.

7. The transport demultiplexor of claim 2 wherein the bypassable packet parser appends packet identification information to the first type transport stream packets and to the second type transport stream packets according to the respective types of the first type transport stream and the second type transport stream, and wherein the appended packet identification is used by the transport demultiplexor to selectively route the first type transport stream and the second type transport stream to the video unloader, the audio unloader, and the data unloader.

8. A transport demultiplexor for receiving a first and second type of transport stream, the transport demultiplexor comprising:
 a) front end logic;
 b) a packet buffer;
 c) a video unloader;
 d) a data unloader; and
 e) an audio unloader;
said front end logic receiver transport stream input packets, and delivering said transport stream packets to the packet buffer, and said packet buffer delivering first type transport stream system data to the data unloader, first type transport stream video data to the video unloader, and first type transport audio data to the audio loader, said packet buffer delivering second type transport stream data to the data unloader for delivering the second type transport stream data to system memory for processing, the front end logic including a bypassable synchronizer, the bypassable synchronizer receiving the first and second type of transport stream and synchronizing the first type transport stream into first type transport stream packets on predefined packet boundaries before passing said first type transport stream, the bypassable synchronizer passing second type of transport stream packets without regard to predefined packet boundaries.

9. The transport demultiplexor of claim 8 wherein the front end logic includes a bypassable packet parser, the bypassable packets parser receiving the first and second type of transport stream from the bypassable synchronizer, the bypassable parser filtering the first type transport stream data before passing to the packet buffer, the bypassable packet parser delivering second type transport stream data to the packet without filtering.

10. The transport demultiplexor of claim 9 wherein the bypassable packet parser retrieves identification information from first type transport stream packets, and wherein the bypassable packet parser appends packet identification to the first type transport stream packets from the retrieved identification information, the appended packet identification used identify the first type transport packets as video packets, audio packets or system data packets, and wherein the packet parser appends identification information to the second type transport stream packets to identify the second type transport stream packets.

11. The transport demultiplexor of claim 10 wherein first type transport stream appended packet identification is used to selectively route the first type transport stream packets to the video unloader, the audio unloader, and the data unloader, and wherein the second type transport stream appended packet identification is used to route the second type transport packets to the data unloader.

12. The transport demultiplexor of claim 8 wherein the buffer control includes a packet manager, the packet manager selectively retrieving first type transport stream video data when requested by the video unloader, the packet manager selectively retrieving first type transport audio data when requested by the audio unloader, the packet manager selectively retrieving said first type transport stream system data and second type transport stream data from the packet buffer when requested by the data unloader.

13. The transport demultiplexor of claim 8 wherein the data unloader includes a queue control, said queue control controlling storage location of said first transport stream system data in system memory.

14. A transport demultiplexor for receiving a first and second type of transport stream, the transport demultiplexor comprising:
 a) front end logic;
 b) a packet buffer;
 c) a video unloader;
 d) a data unloader; and
 e) an audio unloader;
said front end logic receiver transport stream input packets, and delivering said transport stream packets to the packet buffer, and said packet buffer delivering first type transport stream system data to the data unloader, first type transport stream video data to the video unloader, and first type transport audio data to the audio loader, said packet buffer delivering second type transport stream data to the data unloader for delivering the second type transport stream data to system memory for processing, wherein the first type of transport stream comprises an MPEG-2 transport stream, and wherein the second type of transport stream comprises a non-MPEG-2 transport stream.

15. The transport demultiplexor of claim 14 wherein the front end logic includes a bypassable packet parser, the bypassable packer parser receiving the list and second type of transport stream from the bypassable synchronizer, the bypassable packet parser filtering the first type transport stream data before passing to the packet buffer, the bypassable packet parser delivering second type transport stream data to the packet buffer without filtering.

16. The transport demultiplexor claim 15 wherein the bypassable packet parser retrieves identification information from first type transport stream packets, and wherein the bypassable packet parser appends packet identification to the first type transport stream packets from the retrieved identification information, the appended packet identification use identify the first type transport stream packets as video packets, audio packets or system data packets, and wherein the packet parser appends identification information to the second type transport stream packets to identify the second type transport stream packets.

17. The transport demultiplexor of claim 16 wherein first type transport stream appended packet identification is used to selectively route the first type transport stream packets to the video unloader, the audio unloader, and the data unloader, and wherein the second type transport stream appended packet identification is used to route the second type transport packets to the data unloader.

18. The transport demultiplexor of claim 14 wherein the buffer control includes a packet manager, the packet manager selectively retrieving first type stream video data when requested by the video unloader, the packet manager selectively retrieving first type transport audio data when requested by the audio unloader, the packet manager selectively retrieving said first type transport stream system data and second type transport stream data from the packet buffer when requested by the data unloader.

19. The transport demultiplexor of claim 14 wherein the data unloader includes a queue control, said queue control controlling storage location of said first transport stream system data in system memory.

20. A transport demultiplexor for receiving MPEG-2 transport stream and alternative transport stream, the transport demultiplexor comprising:
 a) packet buffer;
 b) front end logic, the front end logic selectively receiving the MPEG-2 transport stream and the alternative transport stream, the front end logic comprising:

i) a bypassable synchronizer, the bypassable synchronizer receiving the MPEG-2 transport stream and the alternative transport stream, and synchronizing the MPEG-2 transport stream on MPEG-2 packet boundaries, the bypassable synchronizer passing said alternative transport stream without regard to predefined packet boundaries;

ii) a bypassable packet parser, the bypassable packet parser selectively receiving the MPEG-2 transport stream and the alternative transport stream, wherein the bypassable packet parser wherein the bypassable packet parser retrieves identification information from first type transport stream packets, and wherein the bypassable packet parser retrieves identification information from the MPEG-2 transport stream and appends packet identification from the retrieved identification information to the MPEG-2 transport packets, the appended packet identification used identify the MPEG-2 transport stream packets as video packets, audio packets or system data packets, and wherein the packet parser appends identification information to the second type transport stream packets to identify the second type transport stream packets, and wherein the bypassable packet parser filters the MPEG-2 transport stream data before passing appended MPEG-2 transport stream packets to the packet buffer, and wherein the bypassable packet parser passes appended alternative transport stream packets to the packet buffer without filtering;

c) a video unloader, the video unloader receiving MPEG-2 video packets from the packet buffer;

d) an audio unloader, the audio unloader receiving MPEG-2 audio packets from the packet buffer, and e) data unloader, the data receiving MPEG-2 system data packets and receiving alternative transport stream packets, the data unloader delivering the alternative transport stream packets to system memory for processing.

\* \* \* \* \*